US010852845B2

(12) United States Patent
Su et al.

(10) Patent No.: US 10,852,845 B2
(45) Date of Patent: Dec. 1, 2020

(54) KEY MODULE

(71) Applicants: LITE-ON ELECTRONICS (GUANGZHOU) LIMITED, Guangzhou (CN); Lite-On Technology Corporation, Taipei (TW)

(72) Inventors: Chih-Wen Su, Taipei (TW); Yu-Hsun Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 5 days.

(21) Appl. No.: 16/413,584

(22) Filed: May 15, 2019

(65) Prior Publication Data

US 2020/0042103 A1 Feb. 6, 2020

(30) Foreign Application Priority Data

Aug. 6, 2018 (CN) .......................... 2018 1 0885701

(51) Int. Cl.
*G06F 3/02* (2006.01)
*G06F 3/023* (2006.01)
*H01H 13/83* (2006.01)
*H01H 13/7065* (2006.01)

(52) U.S. Cl.
CPC .......... *G06F 3/0219* (2013.01); *G06F 3/0238* (2013.01); *H01H 13/7065* (2013.01); *H01H 13/83* (2013.01); *H01H 2219/037* (2013.01)

(58) Field of Classification Search
CPC . G06F 3/0219; G06F 3/0238; H01H 13/7065; H01H 13/83

USPC .................................................. 200/5 A, 329
See application file for complete search history.

(56) References Cited

U.S. PATENT DOCUMENTS

2015/0248173 A1* 9/2015 Hinz ...................... H01H 13/83
349/1

FOREIGN PATENT DOCUMENTS

CN 203339030 * 12/2013 ............. H01H 13/83

OTHER PUBLICATIONS

"Office Action of Taiwan Counterpart Application", dated Jun. 10, 2019, pp. 1-8.

* cited by examiner

*Primary Examiner* — Nguyen Tran
*Assistant Examiner* — Iman Malakooti
(74) *Attorney, Agent, or Firm* — JCIPRNET (57) ABSTRACT

A key module including a base, a circuit layer, at least one light-transmission key body, and a display panel is provided. The circuit layer is disposed at the base and has at least one input portion. The light-transmission key body has an abutting end and a pressing end opposite to each other. The abutting end abuts the base, and the light-transmission key body is adapted to be pressed downward by taking the abutting end as a rotation axis, such that the pressing end presses the input portion. The display panel is disposed at the base and has at least one display region, the display region is aligned with the light-transmission key body, and an image displayed on the display region by the display panel is changeable.

18 Claims, 13 Drawing Sheets

KEY MODULE

CROSS REFERENCE TO RELATED APPLICATION

This application claims the priority benefit of China application serial no. 201810885701.6, filed on Aug. 6, 2018. The entirety of the above-mentioned patent application is hereby incorporated by reference herein and made a part of specification.

BACKGROUND OF THE INVENTION

Field of the Invention

The disclosure relates to an input module, and in particular, to a key module.

Description of Related Art

The key body of a general keyboard is mostly formed by plastic injection molding, and the image (e.g., a text, a symbol, etc.) on each key body and the corresponding input command have both been set up at the time the product leaves the factory, so a user cannot define them by himself/herself. In some key modules, an additional macro key is provided for the user to switch an input command corresponding to the key body on his/her own, but the image on the key body cannot be correspondingly changed. As a result, the user cannot currently know the input command corresponding to each key body at a glance.

SUMMARY OF THE INVENTION

The invention provides a key module in which an image shown on the key body is changeable.

A key module of the invention includes a base, a circuit layer, at least one light-transmission key body, and a display panel. The circuit layer is disposed at the base and has at least one input portion. The light-transmission key body has an abutting end and a pressing end opposite to each other. The abutting end abuts against the base, and the light-transmission key body is adapted to be pressed downward by taking the abutting end as a rotation axis, such that the pressing end presses the input portion. The display panel is disposed at the base and has at least one display region. The display region is aligned in position with the light-transmission key body, and an image displayed on the display region of the display panel is changeable.

In an embodiment of the invention, the key module includes a control unit. The control unit is coupled to the circuit layer and the display panel, and the control unit is adapted to switch an input command corresponding to the input portion and is adapted to correspondingly control an image change displayed by the display region.

In an embodiment of the invention, the base includes a bottom plate. The display panel is disposed between the bottom plate and the circuit layer, and the circuit layer is disposed between the display panel and the light-transmission key body.

In an embodiment of the invention, the circuit layer has at least one first opening, the first opening exposes the display region, and the input portion is located on a side of the first opening of the circuit layer.

In an embodiment of the invention, the base includes a frame having at least one second opening, the light-transmission key body is located in the second opening, and the abutting end abuts against an inner edge of the second opening.

In an embodiment of the invention, the frame has a first protruding portion at the inner edge of the second opening, the light-transmission key body has a second protruding portion at the abutting end, and a position of the second protruding portion is limited below the first protruding portion.

In an embodiment of the invention, the light-transmission key body has a shoulder portion at the abutting end, and the first protruding portion is clamped between the shoulder portion and the second protruding portion.

In an embodiment of the invention, the frame has a first stop portion at another inner edge of the second opening, the light-transmission key body has a second stop portion at the pressing end, the first stop portion and the second stop portion stop each other, and when the light-transmission key body is pressed downward, the second stop portion is separated downward from the first stop portion.

In an embodiment of the invention, the base further includes an upper cover. The upper cover covers the frame and has at least one third opening, and the third opening exposes the light-transmission key body.

In an embodiment of the invention, the input portion is an elastic body disposed to correspond to the pressing end of the light-transmission key body, and the pressing end is adapted to resist an elasticity of the input portion for pressing the input portion and is adapted to return back in position through the elasticity of the input portion.

In an embodiment of the invention, the key module further includes at least one optical element. The optical element is disposed between the light-transmission key body and the display region.

A key module of the invention includes a base, a circuit layer, at least one light-transmission key body, and at least one display unit. The circuit layer is disposed at the base and has at least one input portion. The light-transmission key body is disposed above the circuit layer and is adapted to be pressed downward to press the input portion. The display unit is disposed at a bottom portion of the light-transmission key body and is adapted to be lifted and lowered along with the light-transmission key body. An image displayed by the display unit is changeable.

In an embodiment of the invention, the key module further includes a control unit. The control unit is coupled to the circuit layer and the display unit, and the control unit is adapted to switch an input command corresponding to the input portion and is adapted to correspondingly control an image change displayed by the display unit.

In an embodiment of the invention, the key module further includes at least one scissor mechanism connected between the display unit and the base.

In an embodiment of the invention, the key module further includes at least one connecting member. The display unit and the scissor mechanism are connected to each other by the connecting member.

In an embodiment of the invention, the display unit is adhered to the connecting member.

In an embodiment of the invention, the connecting member has a plurality of pivotal connection structures, and the scissor mechanism is pivotally connected to the pivotal connection structures.

In an embodiment of the invention, the light-transmission key body or the display unit has a plurality of pivotal connection structures, and the scissor mechanism is pivotally connected to the pivotal connection structures.

In an embodiment of the invention, the base includes a bottom plate and an upper cover, the circuit layer is disposed between the bottom plate and the display unit, the upper cover has at least one opening, the opening exposes the light-transmission key body, the input portion is an elastic body, and the light-transmission key body is adapted to resist an elasticity of the input portion for pressing the input portion and is adapted to return back in position through the elasticity of the input portion.

In an embodiment of the invention, a periphery of the light-transmission key body is provided with a plurality of hooks, and the display unit is engaged with the light-transmission key body through the hooks.

Based on the above, in the key module of the invention, the display panel (or the display unit) is disposed below the light-transmission key body and is used to display an image corresponding to the light-transmission key body, such that a user can see the image through the light-transmission key body. Therefore, as the key module switches the input commands corresponding to each of the light-transmission key bodies, the display panel (or the display unit) can correspondingly change the images corresponding to each of the light-transmission key bodies, such that the user can currently know the input commands corresponding to each of the light-transmission key bodies at a glance. Further, a single or modularized key module may be applied to a macro key of a gaming keyboard or a special function key of a general keyboard, such that the user can change the text/symbol of each key and set its function at the same time on his/her own through software.

To make the aforementioned more comprehensible, several embodiments accompanied with drawings are described in detail as follows.

DESCRIPTION OF THE EMBODIMENTS

Figure 1:
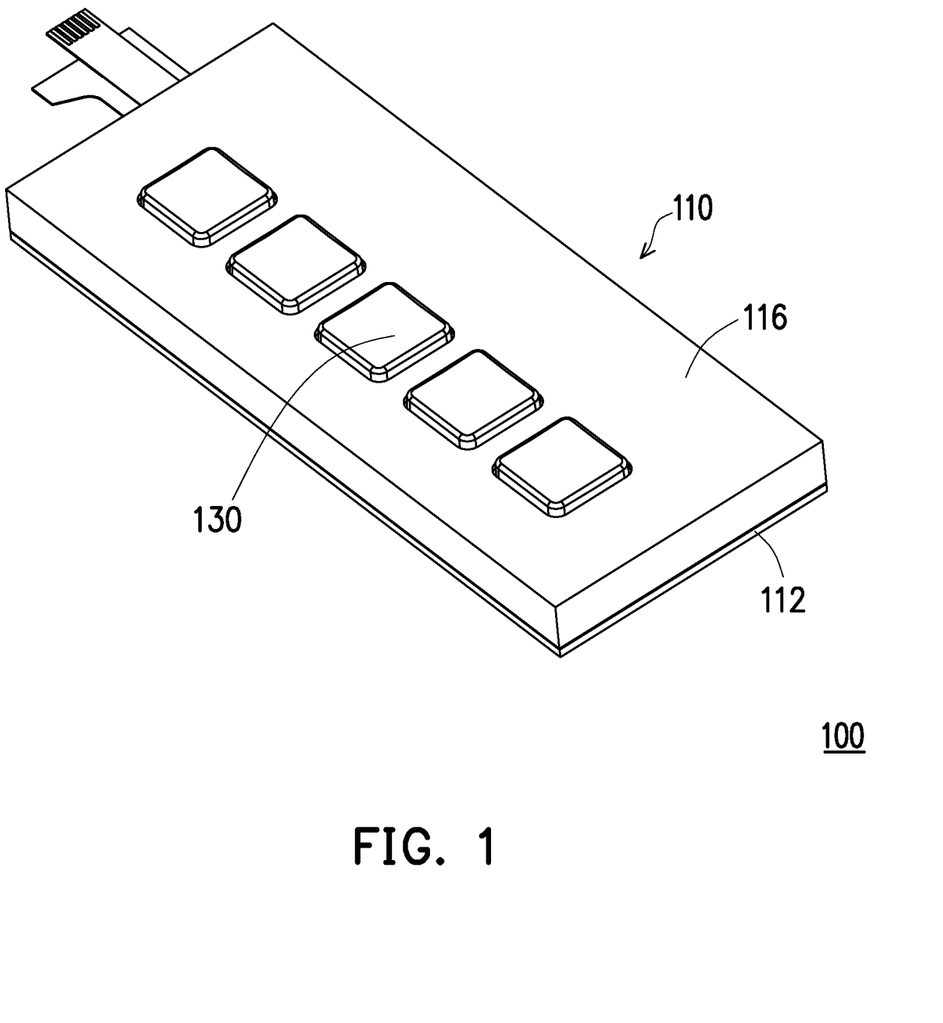
FIG. 1 is a perspective view of a key module according to an embodiment of the invention.
Figure 2:
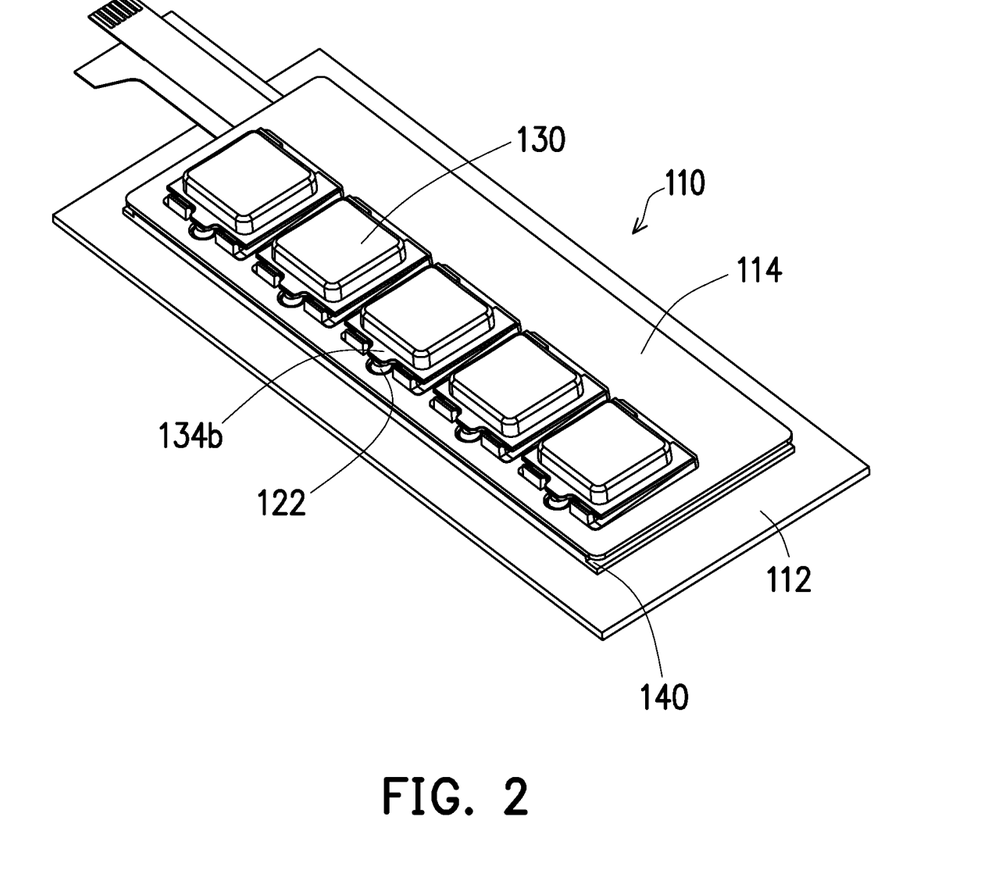
FIG. 2 is a perspective view of a part of the components of the key module of FIG. 1.
Figure 3:
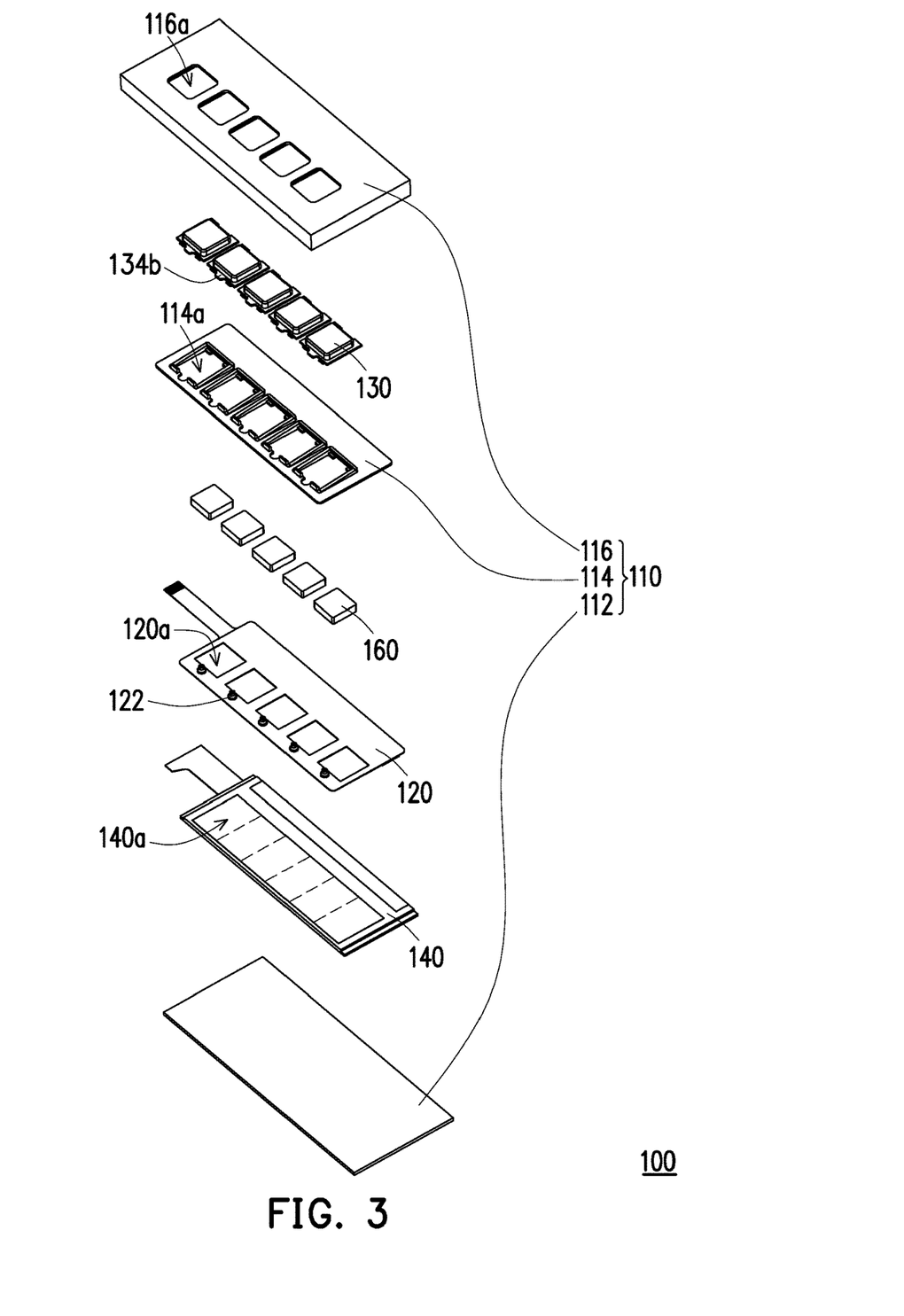
FIG. 3 is an exploded view of the key module of FIG. 1.

FIG. 1 is a perspective view of a key module according to an embodiment of the invention. FIG. 2 is a perspective view of a part of the components of the key module of FIG. 1. FIG. 3 is an exploded view of the key module of FIG. 1. Referring to FIG. 1 to FIG. 3, a key module 100 of the present embodiment includes a base 110, a circuit layer 120, at least one light-transmission key body 130 (shown as plural), and a display panel 140. The circuit layer 120 is, for example, a membrane disposed at the base 110 and having at least one input portion 122 (shown as plural). Each of the light-transmission key bodies 130 is, for example, a transparent plastic member that is movably disposed at the base 110 and that is adapted to be pressed downward to press the input portion 122 of the circuit layer 120.

The display panel 140 is, for example, an E-paper display panel, an organic light emitting diode (OLED) display panel, or other types of display panel disposed at the base 110 and having at least one display region 140a (shown as plural). The display regions 140a are respectively aligned in position with the light-transmission key bodies 130, and each of the display regions 140a is used to display an image (e.g., a text, a symbol, etc.) corresponding to the light-transmission key body 130, such that a user can see the image through the light-transmission key body 130.

The key module 100 of the present embodiment includes a control unit coupled to the circuit layer 120 and the display panel 140. The control unit is adapted to switch input commands corresponding to each of the input portions 122 and is adapted to correspondingly control an image change displayed by the display regions 140a. Thereby, as the key module 100 switches the input commands corresponding to each of the light-transmission key bodies 130, the display panel 140 can correspondingly change the images corresponding to each of the light-transmission key bodies 130, such that the user can know the input commands currently corresponding to each of the light-transmission key bodies 130 at a glance. Further, a single or modularized key module 100 may be applied to a macro key of a gaming keyboard or a special function key of a general keyboard, such that the user can change the text/symbol of each key and set its function at the same time on his/her own through software.

The specific structure of the key module 100 of the present embodiment will be described in detail below. As shown in FIG. 1 to FIG. 3, the base 110 of the present embodiment includes a bottom plate 112, a frame 114, and an upper cover 116. The display panel 140 is disposed between the bottom plate 112 and the circuit layer 120, and the circuit layer 120 is disposed between the display panel 140 and the light-transmission key bodies 130. The circuit layer 120 has at least one first opening 120a (shown as plural), and the first openings 120a respectively expose the display regions 140a. The frame 114 has at least one second opening 114a (shown as plural), and the light-transmission key bodies 130 are respectively located in the second openings 114a. The upper cover 116 covers the frame 114 and has at least one third opening 116a (shown as plural), and the third openings 116a respectively expose the light-transmission key bodies 130.

Figure 4:
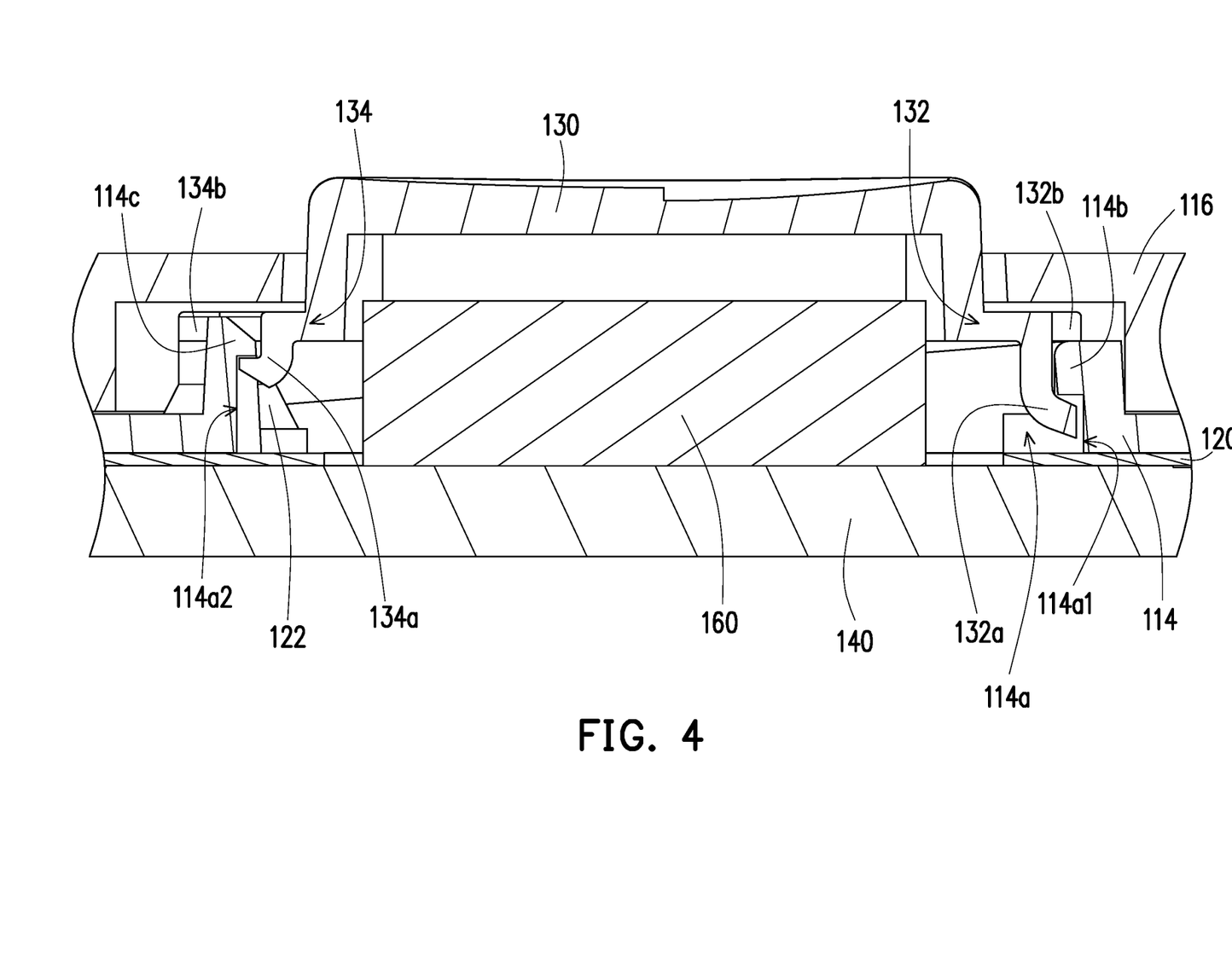
FIG. 4 is a schematic view of a part of the components of the key module of FIG. 1.
Figure 5:
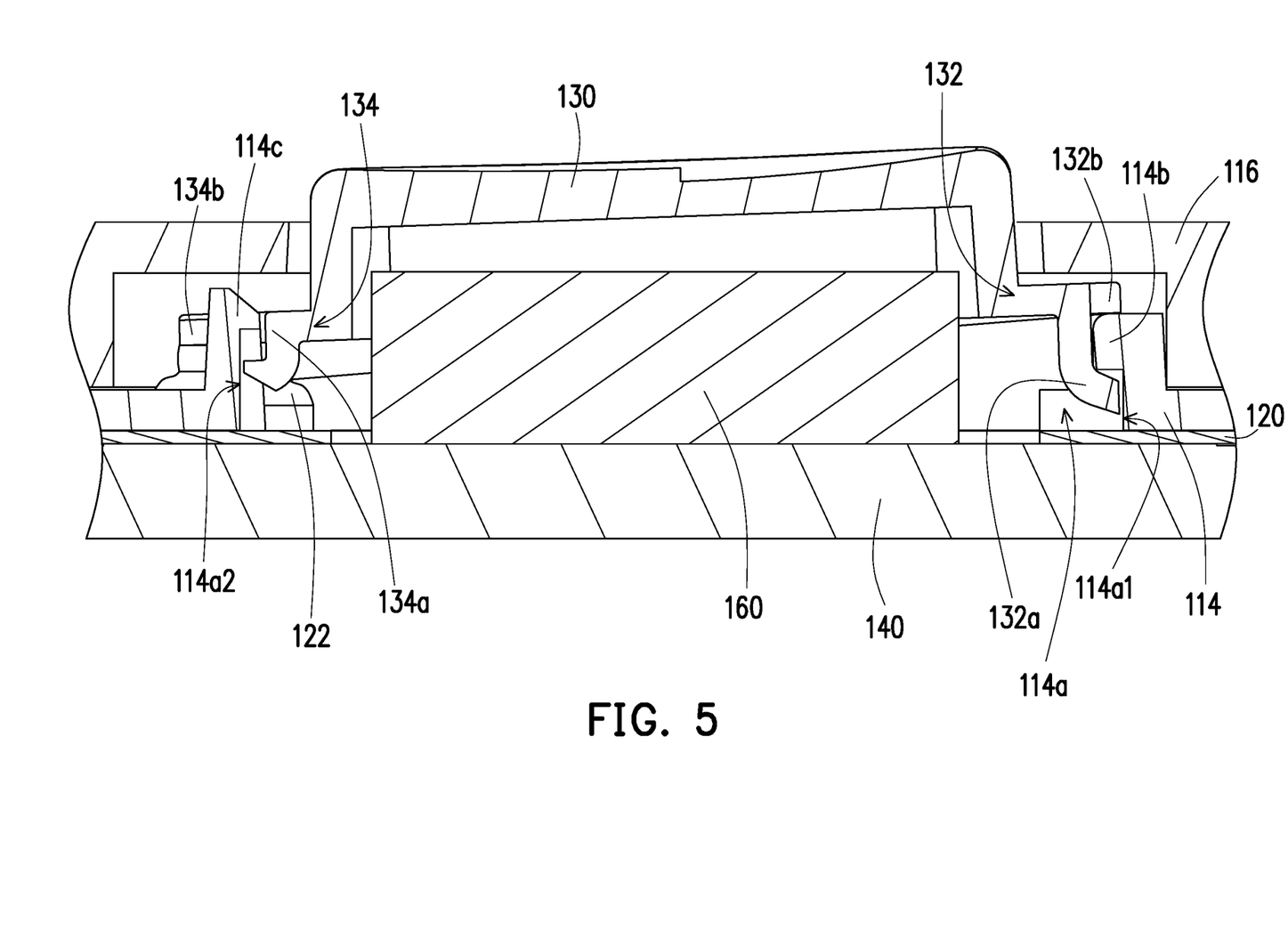
FIG. 5 is a partial cross-sectional view of the key module of FIG. 1.
Figure 6:
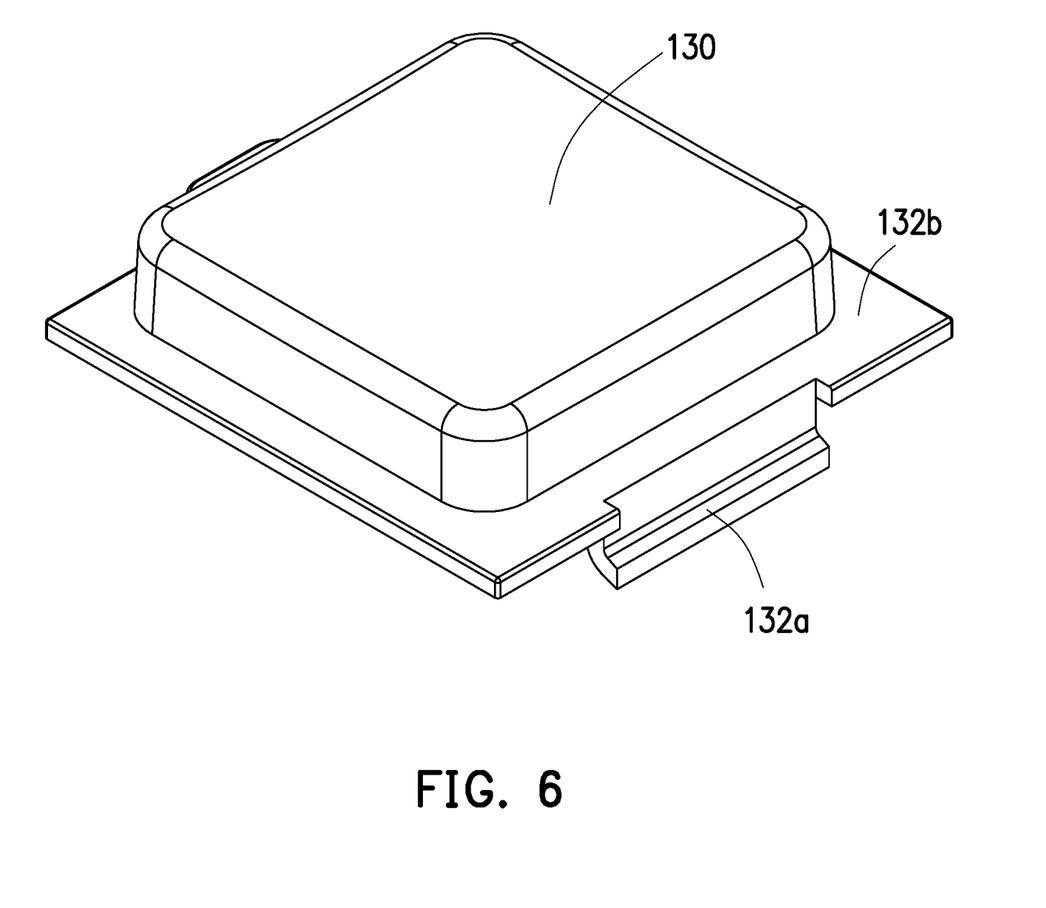
FIG. 6 is a perspective view of a light-transmission key body of FIG. 1.

FIG. 4 is a partial cross-sectional view of the key module of FIG. 1. FIG. 5 illustrates a light-transmission key body of FIG. 4 being pressed. FIG. 6 is a perspective view of the light-transmission key body of FIG. 1. Referring to FIG. 4 to FIG. 6, more specifically, the light-transmission key body 130 of the present embodiment has an abutting end 132 (labeled in FIG. 4 and FIG. 5) and a pressing end 134 (labeled in FIG. 4 and FIG. 5) opposite to each other. The frame 114 has a first protruding portion 114b (labeled in FIG. 4 and FIG. 5) at an inner edge 114a1 of the second opening 114a, and the light-transmission key body 130 has a second protruding portion 132a and at least one shoulder portion 132b (shown as two in FIG. 6) at the abutting end 132. The abutting end 132 abuts against the first protruding portion 114b of the inner edge 114a1 of the second opening 114a of the frame 114 by its second protruding portion 132a, such that a position of the second protruding portion 132a is limited below the first protruding portion 114b, and the first protruding portion 114b is clamped between the shoulder portion 132b and the second protruding portion 132a.

Thereby, when the user presses the light-transmission key body 130 as shown in FIG. 5, due to the combination relationship between the first protruding portion 114b of the frame 114 and the second protruding portion 132a and the shoulder portion 132b of the abutting end 132 of the light-transmission key body 130, the abutting end 132 of the light-transmission key body 130 is limited to be unable to move down, such that the light-transmission key body 130 can be operated by taking the abutting end 132 as a rotation axis to cause the pressing end 134 to move downward to press the input portion 122.

Figure 7:
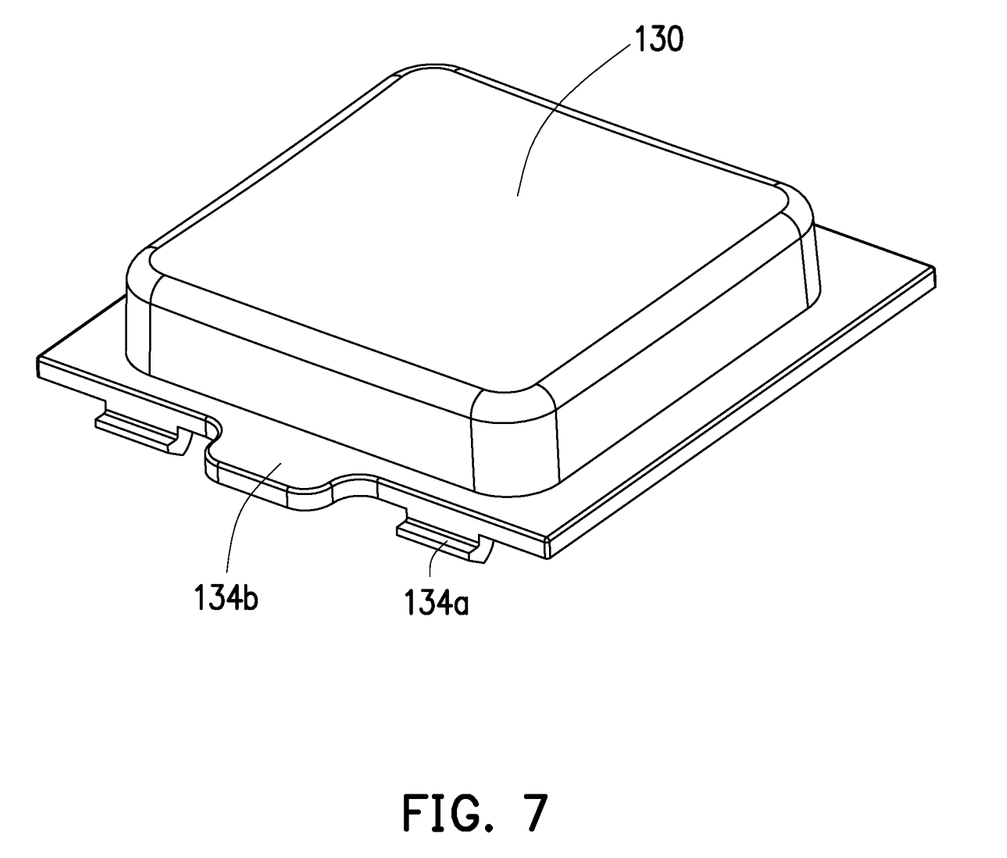
FIG. 7 is a perspective view of the light-transmission key body of FIG. 1 from another viewing angle.
Figure 8:
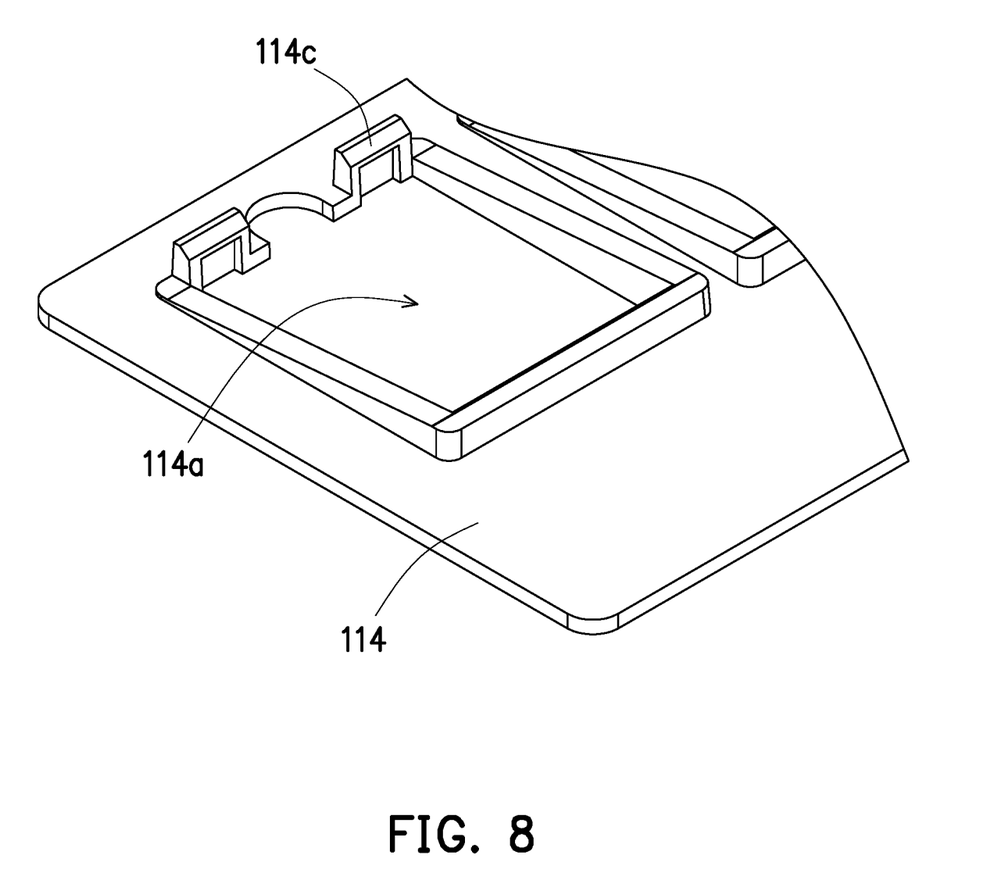
FIG. 8 is a partial perspective view of a frame of FIG. 2.

FIG. 7 is a perspective view of the light-transmission key body of FIG. 1 from another viewing angle. FIG. 8 is a partial perspective view of a frame 114 of FIG. 2. Referring to FIG. 4, FIG. 5, FIG. 7, and FIG. 8, the frame 114 of the present embodiment has at least one first stop portion 114c (shown as two in FIG. 8) at another inner edge 114a2 of the second opening 114a opposite to the inner edge 114a1. The light-transmission key body 130 has at least one second stop portion 134a (shown as two in FIG. 7) at the pressing end 134, and the first stop portion 114c and the second stop portion 134a stop each other to limit an operation range of the light-transmission key body 130. When the light-transmission key body 130 is pressed downward as shown in FIG. 5, the second stop portion 134a is separated downward from the first stop portion 114c. In addition, the input portions 122 of the circuit layer 120 are, for example, elastic bodies such as rubber domes and are respectively disposed to correspond to the pressing end 134 of the light-transmission key body 130. In the present embodiment, each of the input portions 122 is located on a side of the corresponding first opening 120a of the circuit layer 120, and the pressing end 134 of the light-transmission key body 130 is adapted to resist an elasticity of the input portion 122 by a protruding lug 134b for pressing the input portion 122, and is adapted to return back upward in position through the elasticity of the input portion 122.

Figure 9:
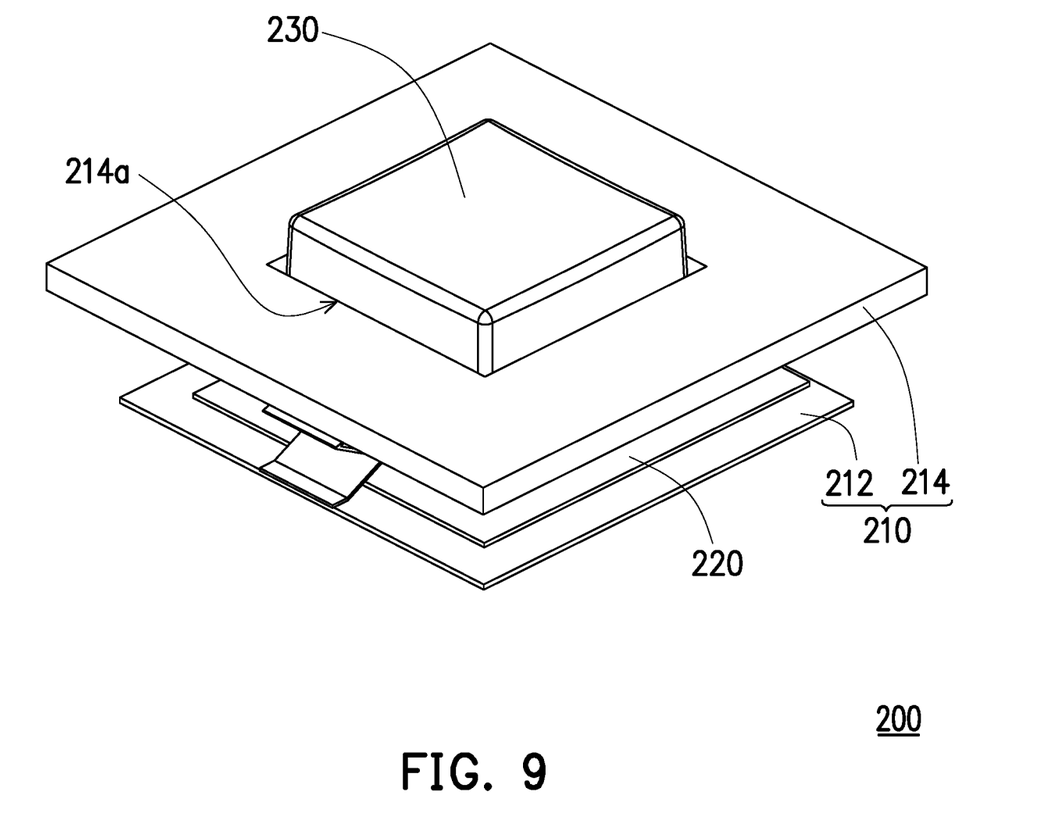
FIG. 9 is a perspective view of a key module according to another embodiment of the invention.
Figure 10:
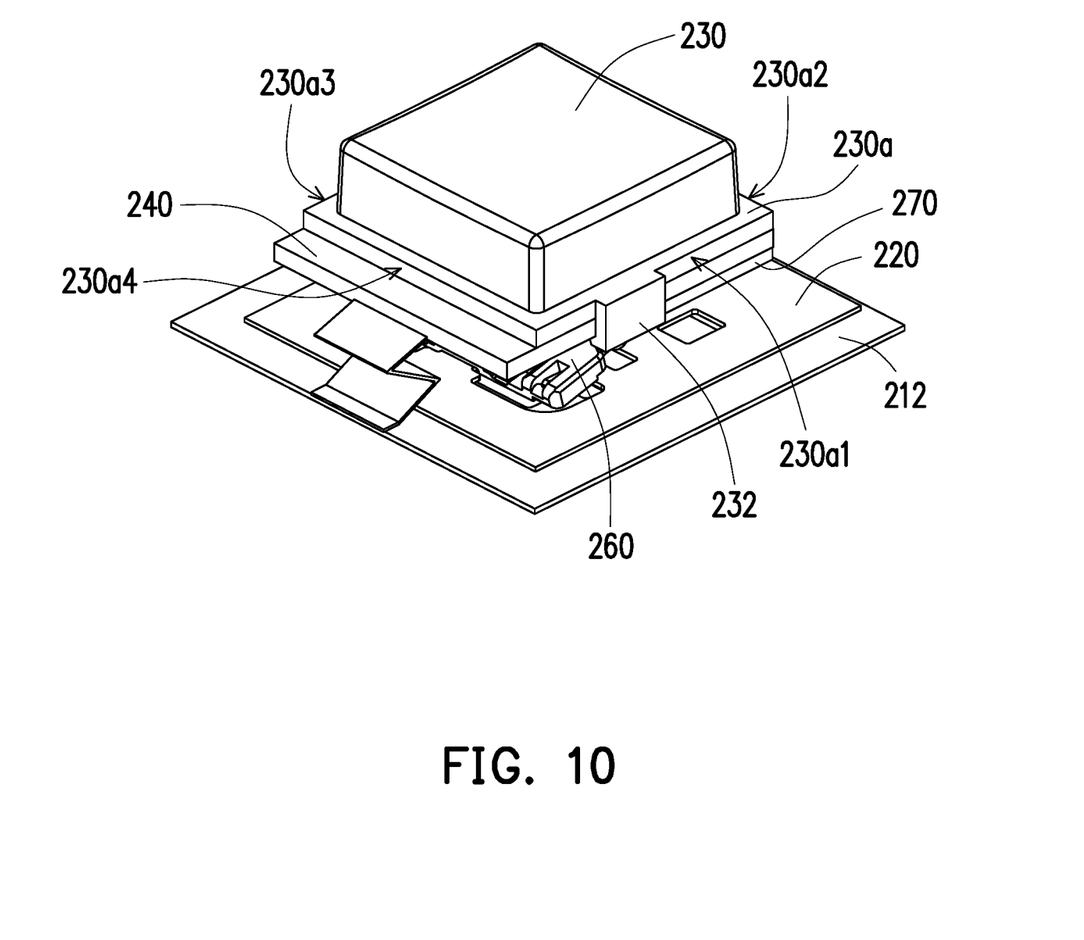
FIG. 10 is a perspective view of a part of the components of the key module of FIG. 9.
Figure 11:
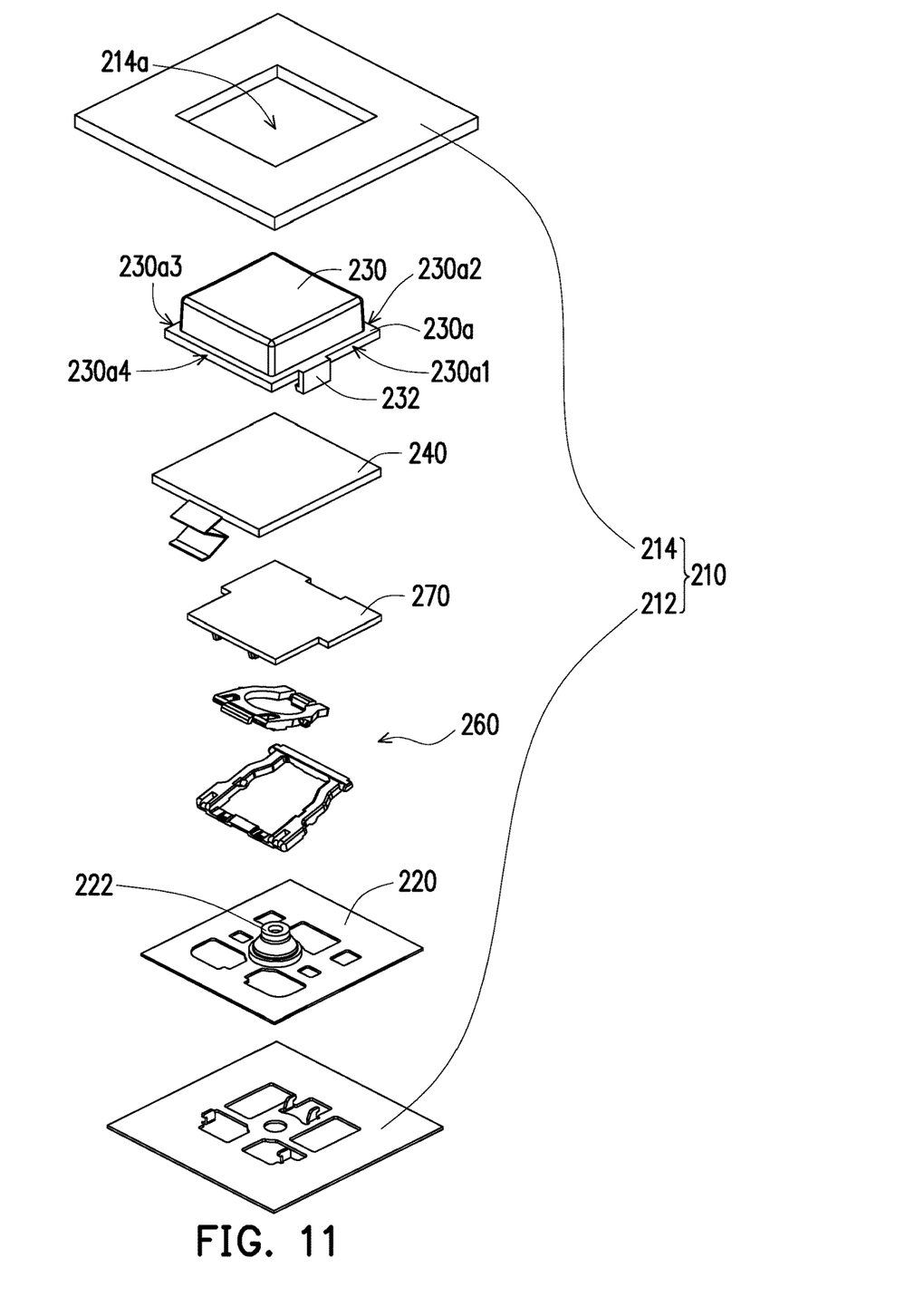
FIG. 11 is an exploded view of the key module of FIG. 9.

Referring to FIG. 3, the key module 100 of the present embodiment may further include at least one optical element 160 (shown as plural). The optical elements 160 are, for example, optical lenses of a fiberscope and are disposed between the light-transmission key bodies 130 and the display regions 140a of the display panel 140. The optical element 160 forms the image (e.g., a text, a symbol, etc.) of the display panel 140 upward to shorten a depth of field generated by a gap between the light-transmission key body 130 and the display region 140a. It is also possible that the key module 100 may not include the optical element 160, and the invention is not limited thereto. FIG. 9 is a perspective view of a key module according to another embodiment of the invention. FIG. 10 is a perspective view of a part of the components of the key module of FIG. 9. FIG. 11 is an exploded view of the key module of FIG. 9. Referring to FIG. 9 to FIG. 11, a key module 200 of the present embodiment includes a base 210, a circuit layer 220, at least one light-transmission key body 230 (shown as one), and a display unit 240 (shown as one). The circuit layer 220 is, for example, a membrane disposed at the base 210 and having at least one input portion 222 (shown as one). The light-transmission key body 230 is, for example, a transparent plastic member that is disposed above the circuit layer 220 and that is adapted to be pressed downward to press the input portion 222 of the circuit layer 220.

The display unit 240 is, for example, an E-paper display unit, an organic light emitting diode (OLED) display unit, or other types of display unit disposed at a bottom portion of the light-transmission key body 230 and adapted to be lifted and lowered along with the light-transmission key body 230. The display unit 240 is used to display an image (e.g., a text, a symbol, etc.) corresponding to the light-transmission key body 230, such that the user can see the image through the light-transmission key body 230.

The key module 200 of the present embodiment includes a control unit coupled to the circuit layer 220 and the display unit 240. The control unit is adapted to switch an input command corresponding to the input portion 222 and is adapted to correspondingly control an image change displayed by the display unit 240. Thereby, as the key module 200 switches the input command corresponding to the light-transmission key body 230, the display unit 240 can correspondingly change the image corresponding to the light-transmission key body 230, such that the user can know the input command currently corresponding to the light-transmission key body 230 at a glance. Further, a single or modularized key module 200 may be applied to a macro key of a gaming keyboard or a special function key of a general keyboard, such that the user can change the text/symbol of each key and set its function at the same time on his/her own through software.

Moreover, since the display unit 240 of the present embodiment is disposed at the bottom portion of the light-transmission key body 230 and is adapted to be lifted and lowered along with the light-transmission key body 230, the display unit 240 and the light-transmission key body 230 may be configured to have a small gap or no gap therebetween, such that the image displayed by the display unit 240 can be displayed through the light-transmission key body 230 clearly without a depth of field.

In other embodiments, the numbers of the light-transmission key body 230, the display unit 240, and the input portion 222 may be plural, such that the key module 200 can form a keyboard module, and the invention is not limited thereto.

Figure 12:
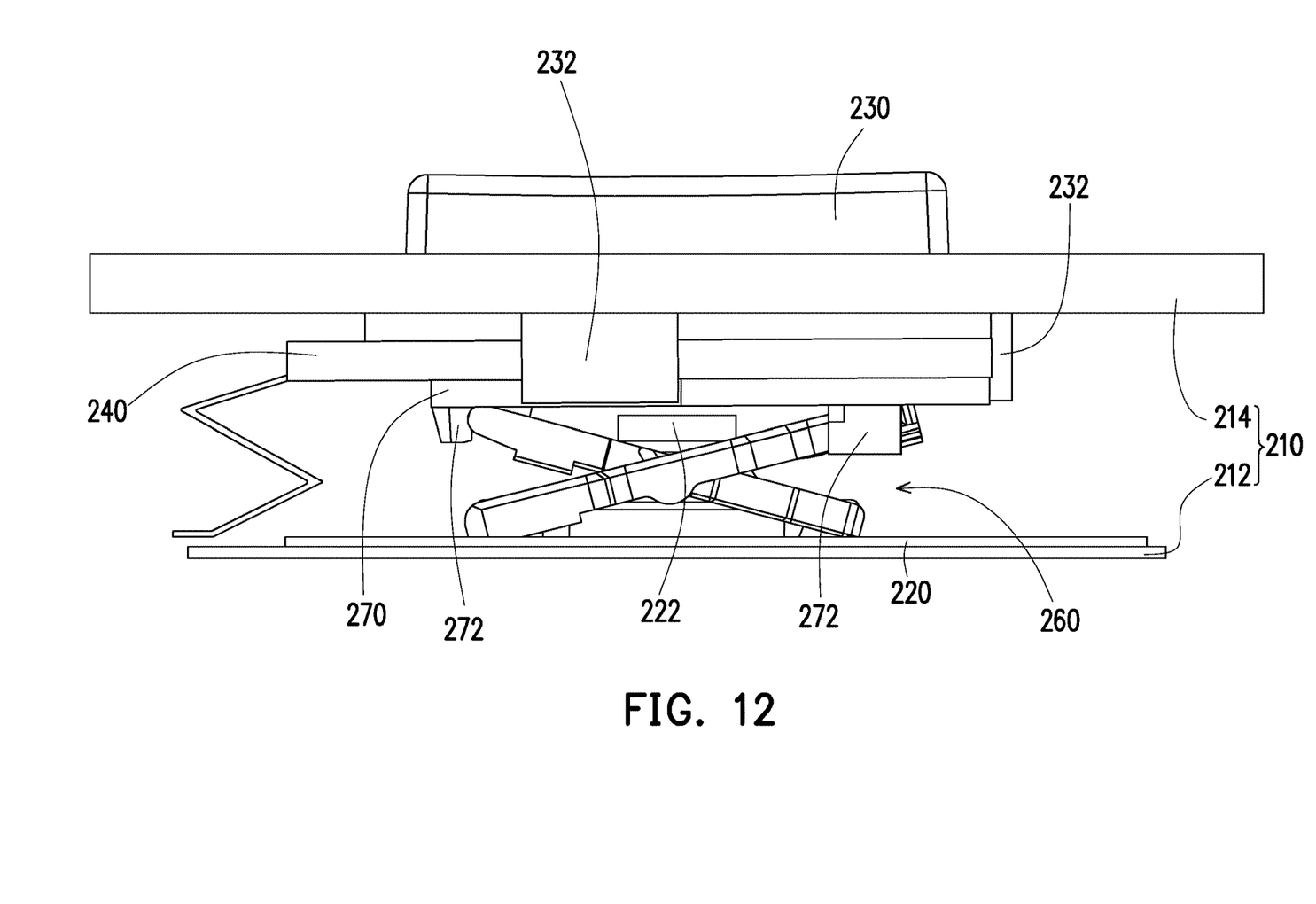
FIG. 12 is a schematic view of a part of the components of the key module of FIG. 9.
Figure 13:
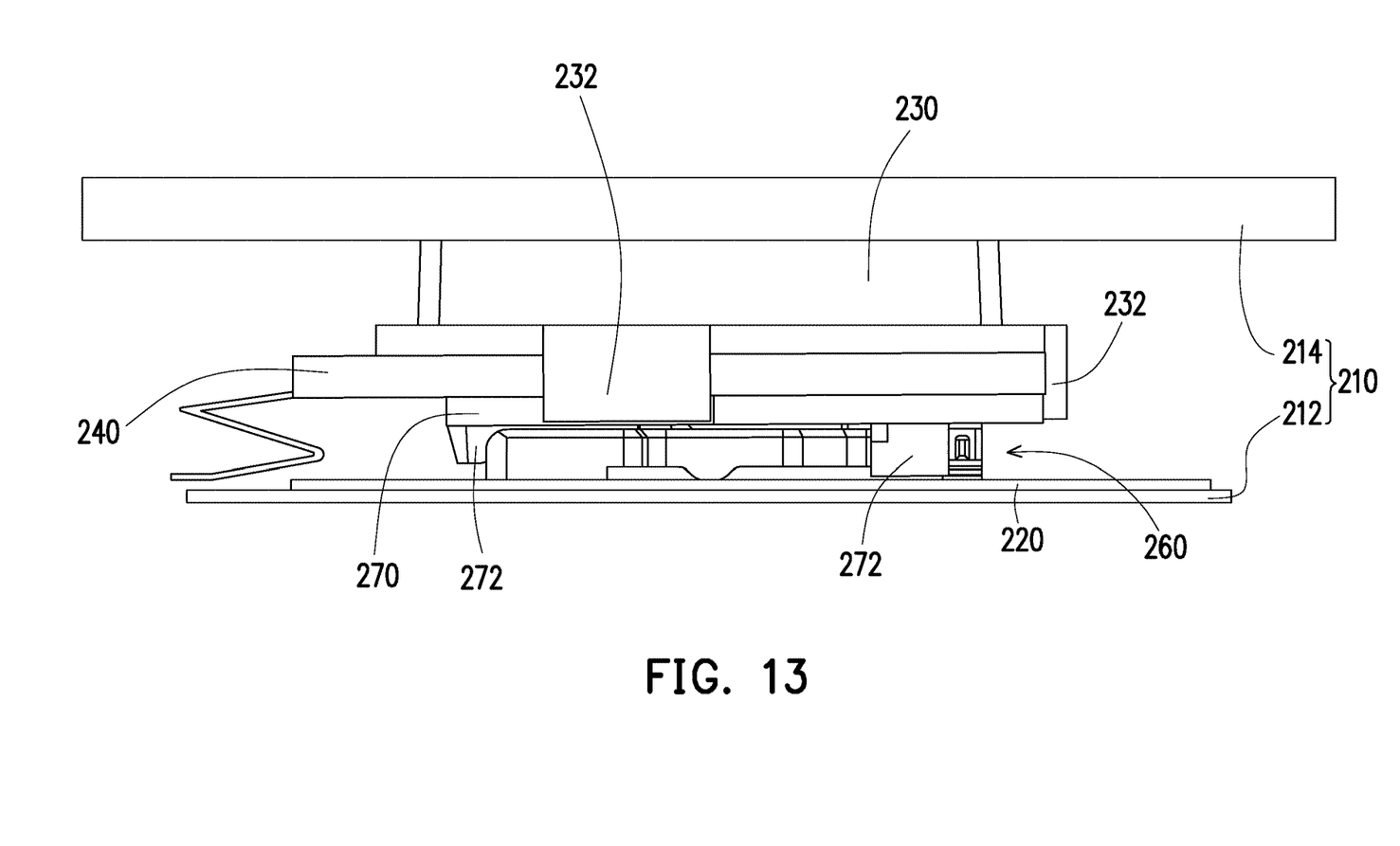
FIG. 13 is a side view of the key module of FIG. 9.

The specific structure of the key module 200 of the present embodiment will be described in detail below. FIG. 12 is a side view of the key module of FIG. 9. FIG. 13 illustrates the light-transmission key body of FIG. 12 being pressed. As shown in FIG. 9 to FIG. 13, the base 210 of the present embodiment includes a bottom plate 212 and an upper cover 214. The circuit layer 220 is disposed between the bottom plate 212 and the display unit 240. The upper cover 214 has at least one opening 214a (shown as one), and the opening 214a exposes the light-transmission key body 230. In addition, the key module 200 includes at least one scissor mechanism 260 and a connecting member 270. The scissor mechanism 260 is connected between the display unit 240 and the bottom plate 212 of the base 210, and the display unit 240 and the scissor mechanism 260 are connected to each other by the connecting member 270. Specifically, the display unit 240 is adhered to the connecting member 270, the connecting member 270 has a plurality of pivotal connection structures 272, and the scissor mechanism 260 is pivotally connected to the pivotal connection structures 272. When the user presses the light-transmission key body 230 downward as shown in FIG. 13, the light-transmission key body 230 and the display unit 240 are lifted and lowered through an operation of the scissor mechanism 260. In other embodiments, the connecting member 270 may also be omitted (not shown), the light-transmission key body 230 or the display unit 240 may have a plurality of pivotal connection structures, and the scissor mechanism 260 is pivotally connected to the pivotal connection structures.

In the present embodiment, a periphery of a shoulder portion 230a of the light-transmission key body 230 is provided with a plurality of hooks 232, and the display unit 240 is engaged with the light-transmission key body 230 through the hooks 232. Specifically, the light-transmission key body 230 has, for example, the hook 232 respectively on three sides 230a1, 230a2, and 230a3 of the shoulder portion 230a to securely engage the display unit 240 and does not have the hook 232 on a side 230a4 of the shoulder portion 230a to prevent interference between a cable of the display unit 240 and the hook 232. In other embodiments, the light-transmission key body 230 and the display unit 240 may be fixed to each other through other means, and the invention is not limited thereto. Therefore, the mutual attachment design of the light-transmission key body 230 and the display unit 240 can minimize the depth of field of the image or preclude the issue of the depth of field and increase readability for the user. In addition, the input portion 222 of the circuit layer 220 is, for example, an elastic body such as a rubber dome, and in the present embodiment, the input portion 222 is located at a position of the circuit layer 220 corresponding to a center of the bottom plate 212 or the light-transmission key body 130. The light-transmission key body 230 is adapted to resist an elasticity of the input portion 222 for pressing the input portion 222 straight downward and is adapted to return back through the elasticity of the input portion 222 in a straight upward manner.

In summary of the above, in the key module of the invention, the display panel (or the display unit) is disposed below the light-transmission key body and is used to display an image corresponding to the light-transmission key body, such that the user can see the image through the light-transmission key body. Thereby, as the key module switches the input commands corresponding to each of the light-transmission key bodies, the display panel (or the display unit) can correspondingly change the images corresponding to each of the light-transmission key bodies, such that the user can know the input commands currently corresponding to each of the light-transmission key bodies at a glance. Further, a single or modularized key module may be applied to the macro key of a gaming keyboard or the special function key of a general keyboard, such that the user can change the text/symbol of each key and set its function at the same time on his/her own through software.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A key module comprising:
   a base;
   a circuit layer, disposed at the base and having at least one input portion;
   at least one light-transmission key body, having an abutting end and a pressing end opposite to each other, wherein the abutting end abuts against the base, and the light-transmission key body is adapted to be pressed downward by taking the abutting end as a rotation axis, such that the pressing end presses the input portion; and
   a display panel, disposed at the base and having at least one display region, wherein the display region is aligned in position with the light-transmission key body, and an image displayed on the display region of the display panel is changeable,
   wherein the base comprises a frame having at least one second opening, the light-transmission key body is located in the second opening, and the abutting end abuts against an inner edge of the second opening.

2. The key module according to claim 1, further comprising a control unit, wherein the control unit is coupled to the circuit layer and the display panel, and the control unit is adapted to switch an input command corresponding to the input portion and is adapted to correspondingly control an image change displayed by the display region.

3. The key module according to claim 1, wherein the base comprises a bottom plate, the display panel is disposed between the bottom plate and the circuit layer, and the circuit layer is disposed between the display panel and the light-transmission key body.

4. The key module according to claim 3, wherein the circuit layer has at least one first opening, the first opening exposes the display region, and the input portion is located on a side of the first opening of the circuit layer.

5. The key module according to claim 1, wherein the frame has a first protruding portion at the inner edge of the second opening, the light-transmission key body has a second protruding portion at the abutting end, and a position of the second protruding portion is limited below the first protruding portion.

6. The key module according to claim 5, wherein the light-transmission key body has a shoulder portion at the abutting end, and the first protruding portion is clamped between the shoulder portion and the second protruding portion.

7. The key module according to claim 1, wherein the frame has a first stop portion at another inner edge of the second opening, the light-transmission key body has a second stop portion at the pressing end, the first stop portion and the second stop portion stop each other, and when the light-transmission key body is pressed downward, the second stop portion is separated downward from the first stop portion.

8. The key module according to claim 1, wherein the base further comprises an upper cover, the upper cover covers the frame and has at least one third opening, and the third opening exposes the light-transmission key body.

9. The key module according to claim 1, wherein the input portion is an elastic body disposed to correspond to the pressing end of the light-transmission key body, and the pressing end is adapted to resist an elasticity of the input portion for pressing the input portion and is adapted to return back in position through the elasticity of the input portion.

10. The key module according to claim 1, further comprising at least one optical element, wherein the optical element is disposed between the light-transmission key body and the display region.

11. A key module comprising:
    a base;
    a circuit layer, disposed at the base and having at least one input portion;
    at least one light-transmission key body, disposed above the circuit layer and adapted to be pressed downward to press the input portion;
    at least one display unit, disposed at a bottom portion of the light-transmission key body and adapted to be lifted and lowered along with the light-transmission key body, wherein an image displayed by the display unit is changeable; and at least one scissor mechanism, connected between the display unit and the base.

12. The key module according to claim 11, further comprising a control unit, wherein the control unit is coupled to the circuit layer and the display unit, and the control unit is adapted to switch an input command corresponding to the input portion and is adapted to correspondingly control an image change displayed by the display unit.

13. The key module according to claim 11, further comprising at least one connecting member, wherein the display unit and the scissor mechanism are connected to each other by the connecting member.

14. The key module according to claim 13, wherein the display unit is adhered to the connecting member.

15. The key module according to claim 13, wherein the connecting member has a plurality of pivotal connection structures, and the scissor mechanism is pivotally connected to the pivotal connection structures.

16. The key module according to claim 10, wherein the light-transmission key body or the display unit has a plurality of pivotal connection structures, and the scissor mechanism is pivotally connected to the pivotal connection structures.

17. The key module according to claim 11, wherein the base comprises a bottom plate and an upper cover, the circuit layer is disposed between the bottom plate and the display unit, the upper cover has at least one opening, the opening exposes the light-transmission key body, the input portion is an elastic body, and the light-transmission key body is adapted to resist an elasticity of the input portion for pressing the input portion and is adapted to return back in position through the elasticity of the input portion.

18. The key module according to claim 11, wherein a periphery of the light-transmission key body is provided with a plurality of hooks, and the display unit is engaged with the light-transmission key body through the hooks.

* * * * *